(12) United States Patent  
Bent et al.

(10) Patent No.: US 9,501,488 B1  
(45) Date of Patent: Nov. 22, 2016

(54) DATA MIGRATION USING PARALLEL LOG-STRUCTURED FILE SYSTEM MIDDLEWARE TO OVERCOME ARCHIVE FILE SYSTEM LIMITATIONS

(71) Applicant: EMC Corporation, Hopkinton, MA (US)

(72) Inventors: John M. Bent, Los Alamos, NM (US); Sorin Faibish, Newton, MA (US); Uday Gupta, Westford, MA (US); Percy Tzelnic, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 267 days.

(21) Appl. No.: 14/143,694

(22) Filed: Dec. 30, 2013

(51) Int. Cl.  
G06F 17/30 (2006.01)

(52) U.S. Cl.  
CPC ... *G06F 17/30091* (2013.01); *G06F 17/30194* (2013.01)

(58) Field of Classification Search  
CPC .................. G06F 17/30218; G06F 17/30091; G06F 11/1435  
See application file for complete search history.

(56) References Cited

U.S. PATENT DOCUMENTS

| 6,385,706 B1* | 5/2002 | Ofek ................... G06F 11/1464 707/999.202 |
| 9,069,778 B1* | 6/2015 | Bent .................... G06F 11/1482 |
| 2013/0304775 A1* | 11/2013 | Davis ................. H04L 67/1097 707/827 |
| 2013/0311612 A1* | 11/2013 | Dickinson ............. G06F 17/301 709/219 |
| 2014/0081924 A1* | 3/2014 | Jennings ........... G06F 17/30197 707/687 |
| 2014/0365537 A1* | 12/2014 | Zhao .................... H04L 67/1097 707/812 |

OTHER PUBLICATIONS

Polte et al., " . . . And Eat It Too: High Read Performance in Write-Optimized HPC I/O Middleware File Formats," Proceedings of the 4th Annual Workshop on Petascale Data Storage, ACM, 2009, pp. 21-25.*

* cited by examiner

*Primary Examiner* — Rehana Perveen  
*Assistant Examiner* — Alexander Khong  
(74) *Attorney, Agent, or Firm* — Ryan, Mason & Lewis, LLP

(57) ABSTRACT

Data migration techniques are provided using parallel log-structured file system middleware to overcome file system limitations. A data file is migrated from a first storage tier to an archive storage tier, where the data file exceeds performance and/or capacity limitations of the archival storage tier, by writing the data file to a plurality of sub-files using a parallel data mover process, wherein each of the plurality of sub-files satisfy the performance and capacity limitations of the archival storage tier; and storing the plurality of sub-files to the archival storage tier using a log-structured file system. The log-structured file system optionally comprises a Parallel Log-Structured File System (PLFS) and the archival storage tier optionally comprises a multi disk storage tier. The parallel data mover process divides a size of the data file by a file size limit of the archival storage tier to determine of a number of the plurality of sub-files. The plurality of sub-files are optionally read using a network file system (NFS).

21 Claims, 5 Drawing Sheets

DATA MIGRATION USING PARALLEL LOG-STRUCTURED FILE SYSTEM MIDDLEWARE TO OVERCOME ARCHIVE FILE SYSTEM LIMITATIONS

FIELD

The present invention relates to data migration in parallel storage environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. Generally, each parallel process generates a portion, referred to as a data chunk, of a shared data object.

Data migration is a common technique to transfer data between storage types, formats, and/or computer systems. Data migration is usually performed programmatically to achieve an automated migration. Data migration occurs for a variety of reasons, such as equipment replacement or to achieve cost effective long term storage of data. It is often desired, however to migrate the data to a system that cannot accommodate the migration due to, for example, performance and/or capacity constraints of the desired archival storage system. In parallel computing systems, for example, such as High Performance Computing (HPC) applications, the inherently complex and large datasets increase the resources required for data storage and transmission. A need therefore exists for improved techniques for migrating data to an archival shared system.

SUMMARY

Embodiments of the present invention provide improved techniques for data migration using parallel log-structured file system middleware to overcome file system limitations. In one embodiment, a method is provided for migrating a data file from a first storage tier to an archive storage tier, wherein the data file exceeds one or more of performance limitations and capacity limitations of the archival storage tier. The data migration method comprises writing the data file to a plurality of sub-files using a parallel data mover process, wherein each of the plurality of sub-files satisfy the performance and capacity limitations of the archival storage tier; and storing the plurality of sub-files to the archival storage tier using a log-structured file system.

In various embodiments, the log-structured file system comprises a Parallel Log-Structured File System (PLFS) and the archival storage tier comprises a multi disk storage tier, such as an exemplary Isilon™ storage system. The first storage tier comprises, for example, one or more of flash storage and disk storage, such as a Lustre™ file system.

According to a further aspect of the invention, the parallel data mover process divides a size of the data file by a file size limit of the archival storage tier to determine of a number of the plurality of sub-files. The plurality of sub-files are optionally read using a network file system (NFS).

Advantageously, illustrative embodiments of the invention provide techniques for data migration using parallel log-structured file system middleware. These and other features and advantages of the present invention will become more readily apparent from the accompanying drawings and the following detailed description.

DETAILED DESCRIPTION

The present invention provides improved techniques for data migration using parallel log-structured file system middleware. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices. As used herein, the term "files" shall include complete files and portions of files, such as sub-files or shards.

Figure 1:
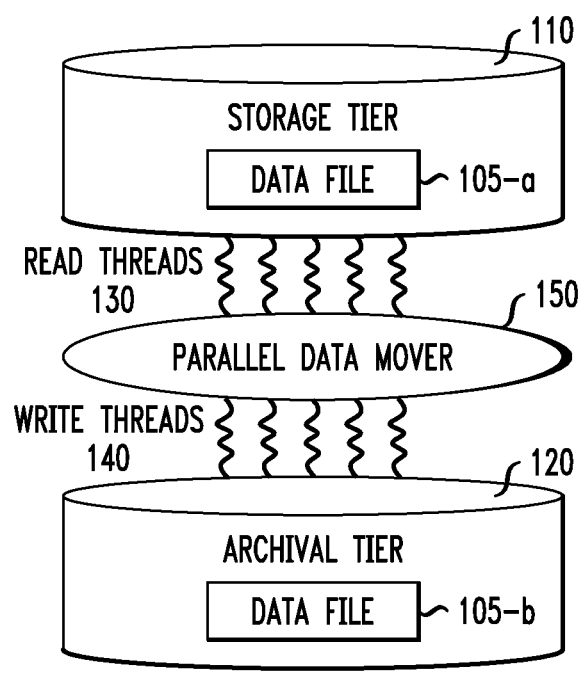
FIG. 1 illustrates an exemplary conventional storage system that employs a parallel data mover to migrate a data file from a first storage tier to an archival storage tier.

FIG. 1 illustrates an exemplary conventional storage system 100 that employs a parallel data mover 150 to migrate a data file 105 from a first storage tier 110 to an archival storage tier 120. The first storage tier 110 may be part of a parallel file system, such as a Lustre™ file system comprised of flash storage and/or disk storage. The archival storage tier 150 may be embodied, for example, as a multi disk storage tier, such as an Isilon™ storage array, commercially available from EMC Corporation. The data file 105-*b* is a duplicate archived copy of the data file 105-*a*.

The parallel data mover 150 may execute on one or more compute nodes (CNs) and employ Message Passing Interface (MPI) communications, in a known manner. As shown in FIG. 1, the exemplary parallel data mover 150 employs a plurality of read threads 130 to read the data file 105-*a* from the first storage tier 110 and a plurality of write threads 140 to write the data file 105-*b* to the archival storage tier 150.

Aspects of the present invention recognize that it may not be possible to migrate the file 105 to the desired archival storage tier 120 due to performance and/or capacity limitations of the archival storage tier 120. For example, an exemplary Isilon™ storage system has a file limit size of 4 TB. Thus, if the size of the data file 105 exceeds 4 TB, then the data file 105 cannot be migrated to an archival storage tier 150 on an Isilon™ storage system. In addition, the exemplary Isilon™ storage system cannot write to a shared file in parallel and does not support sub-file write locks across nodes. Thus, aspects of the present invention employ a Parallel Log-Structured File System (PLFS) to store a file that exceeds the performance and/or capacity limitations of the desired archival storage tier 120 from the first storage tier 110 to the archival storage tier 120. In this manner, PLFS middleware will store the data file 105 as a plurality of sub-files across a plurality of nodes in the archival storage tier 120. The PLFS middleware ensures that each of the plurality of sub-files satisfy the performance and/or capacity limitations of the desired archival storage tier 120.

Figure 2:
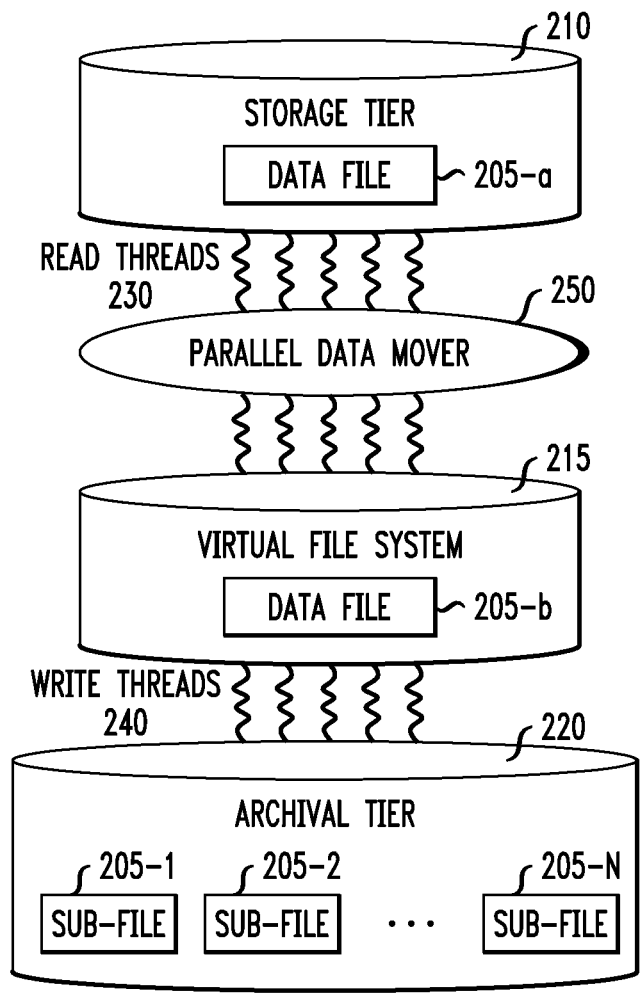
FIG. 2 illustrates the migration of a data file from a first storage tier to an archival storage tier in accordance with aspects of the present invention.

FIG. 2 illustrates the migration of a data file 205-a, such as checkpoints and results generated by one or more high performance computing applications, from a first storage tier 210 to an archival storage tier 220. As noted above, the data file 205-a exceeds one or more of the performance and/or capacity limitations of the archival storage tier 220. A parallel data mover 250 executing, for example, on a transfer cluster, is employed to migrate the data file 205 from the first storage tier 210 to the archival storage tier 220.

In accordance with an aspect of the present invention, the data file 205-b to be migrated is processed by a virtual file system 215 that acts as an I/O Conversion Middleware process. The virtual file system 215 comprises a log structured file system middleware process, such as a Parallel Log-Structured File System (PLFS), as modified herein to provide the features and functions of the present invention. See, for example, John Bent et al., "PLFS: A Checkpoint Filesystem for Parallel Applications," Association for Computing Machinery, SC09 (November 2009), incorporated by reference herein. See also, for example, U.S. patent application Ser. No. 13/536,331, filed Jun. 28, 2012, entitled "Storing Files in a Parallel Computing System Using List-Based Index to Identify Replica Files," (now U.S. Pat. No. 9,087,075), or U.S. patent application Ser. No. 13/730,097, filed Dec. 28, 2012, entitled "Cloud Object Store for Archive Storage of High Performance Computing Data Using Decoupling Middleware," (now U.S. Pat. No. 9,069,778), each incorporated by reference herein.

The log structured file system middleware process 215 can execute, for example, on a burst buffer node or on the corresponding compute node site. The burst buffer node can be embodied, for example, as an Active Burst Buffer Appliance (ABBA), commerically available from Los Alamos National Labs (LANL) and EMC Corporation. A burst buffer hardware node ensures that migration performance is not sacrificed in the case where archive storage might be slower than existing parallel file systems.

As shown in FIG. 2, the virtual file system 215 converts the single data file 205-b to a corresponding plurality of sub-files 205-1 through 205-N that satisfy the performance and/or capacity limitations of the desired archival storage tier 220. The sub-files 205-1 through 205-N are then provided to the desired archival storage tier 220 for storage. The parallel data mover 250 makes write calls directly to the virtual file system 215 (PLFS). In this manner, the virtual file system 215 employs the desired archival storage tier 220, such as the exemplary Isilon™ storage system, as a back end storage.

As shown in FIG. 2, the exemplary parallel data mover 250 employs a plurality of read threads 230 to read the data file 205-a from the first storage tier 210 and a plurality of write threads 240 to write the sub-files 205-1 to 205-N to the archival storage tier 220.

Figure 3:
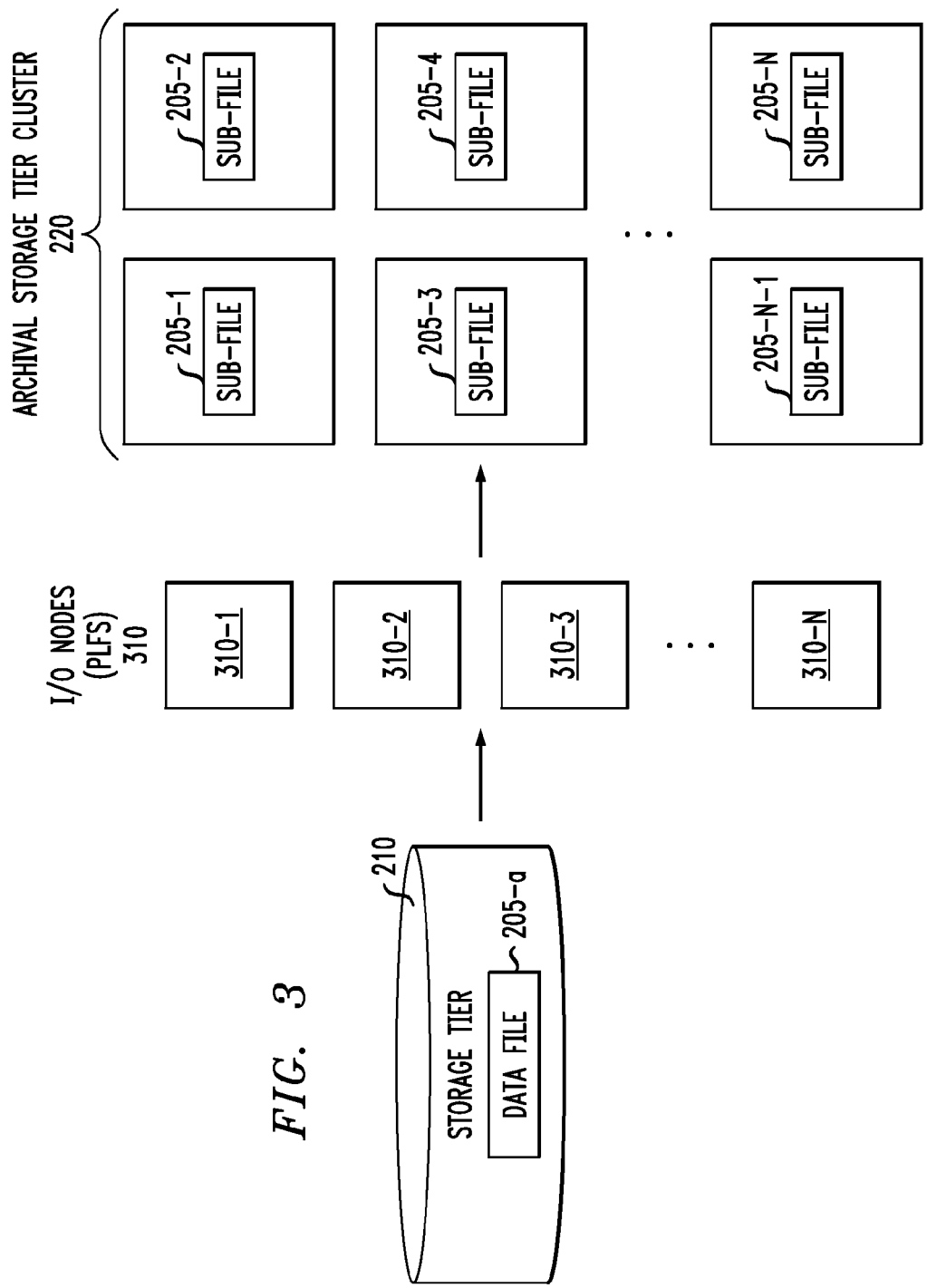
FIG. 3 illustrates the storage of data file as a plurality of sub-files on the archival storage tier of FIG. 2 in further detail.

FIG. 3 illustrates the storage of data file 205-a as a plurality of sub-files 205-1 through 205-N on the archival storage tier 220 in further detail. As shown in FIG. 3, the data file 205-a is processed by an I/O conversion middleware PLFS process on one or more I/O nodes 310. The exemplary I/O conversion middleware PLFS process on nodes 310 is embodied as a Parallel Log-Structured File System, as modified herein to provide the features and functions of the present invention.

The exemplary I/O conversion middleware PLFS process on nodes 310 use a parallel copy program to read the data file 205-a from the first storage tier 210 and write it through PLFS which will parallelize the writes and create smaller sub-files on the archival storage tier cluster 220. Generally, PLFS is installed on a plurality of I/O nodes 310 with multiple nodes in the archival storage tier cluster 220 setup as PLFS back-end storage.

As discussed hereinafter, PLFS splits the large data file 205-a, such as a 20 TB file, into a plurality of sub-files 205-1 through 205-N, where each sub-file satisfies the performance and/or capacity limitations of the archival storage tier 220. Thus, if the exemplary archival storage tier 220 has a file size limit of 4 TB, each sub-file 205-1 through 205-N has a file size that is less than 4 TB. The parallel data mover 250 generates a write thread for each sub-file to create sub-files 205-1 through 205-N having contiguous chunks from the large data file 205-a. In addition, the parallel data mover 250 balances the maximum file size of the archival storage tier 220 while also generating as little metadata as possible (smallest number of sub-files possible to achieve performance and/or capacity limitations of the archival storage tier 220).

Aspects of the present invention thus leverage the parallelism of concurrent writes and the high interconnect speed of parallel supercomputer networks to improve data migration. Aspects of the present invention thus recognize that the log-structured file system can overcome the performance and/or capacity limitations of the archival storage tier 220.

Because PLFS files can be shared across many locations, data processing required to implement these functions can be performed more efficiently when there are multiple nodes cooperating on the data processing operations. Therefore, when this is run on a parallel system with a parallel language, such as MPI, PLFS can provide MPI versions of these functions which will allow it to exploit parallelism for more efficient data processing.

Figure 4:
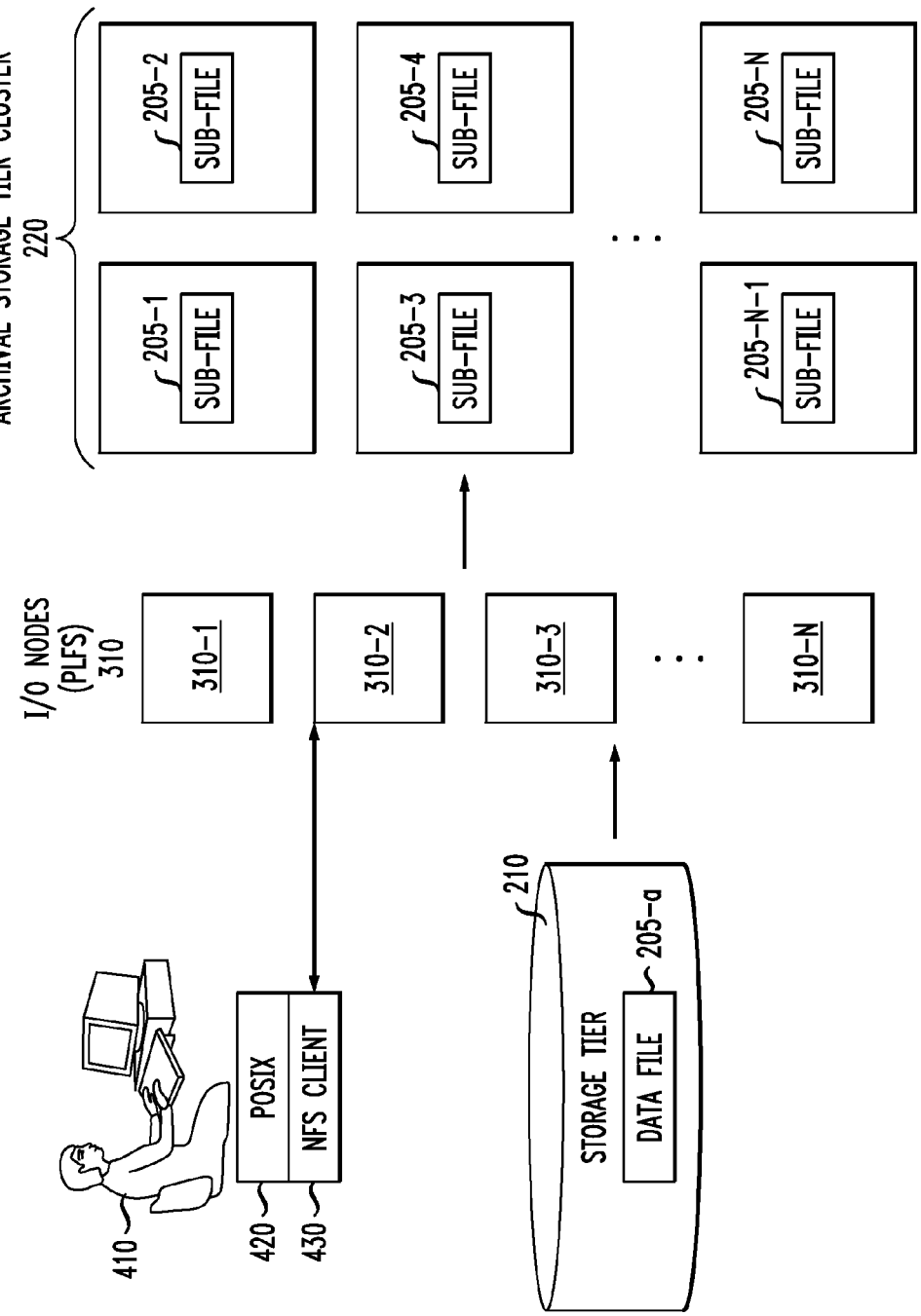
FIG. 4 illustrates the retrieval of data file as a plurality of sub-files from the archival storage tier of FIG. 2 in further detail.

FIG. 4 illustrates the retrieval of data file 205-a as a plurality of sub-files 205-1 through 205-N from the archival storage tier 220 in further detail. As shown in FIG. 4, a user 410 can read the plurality of sub-files 205-1 through 205-N from the archival storage tier 220 through a network file system (NFS). A user-mode file server for NFS can optionally be employed, such as a Genesha™ file server. In one exemplary embodiment, a Portable Operating System Interface (POSIX) 420 is optionally employed in conjunction with an NFS Client 430.

In this manner, clients 410 can directly read the sub-files 205-1 through 205-N from the archival storage tier 220 through NFS, Ganesha and PLFS in the exemplary embodiment.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

Figure 5:
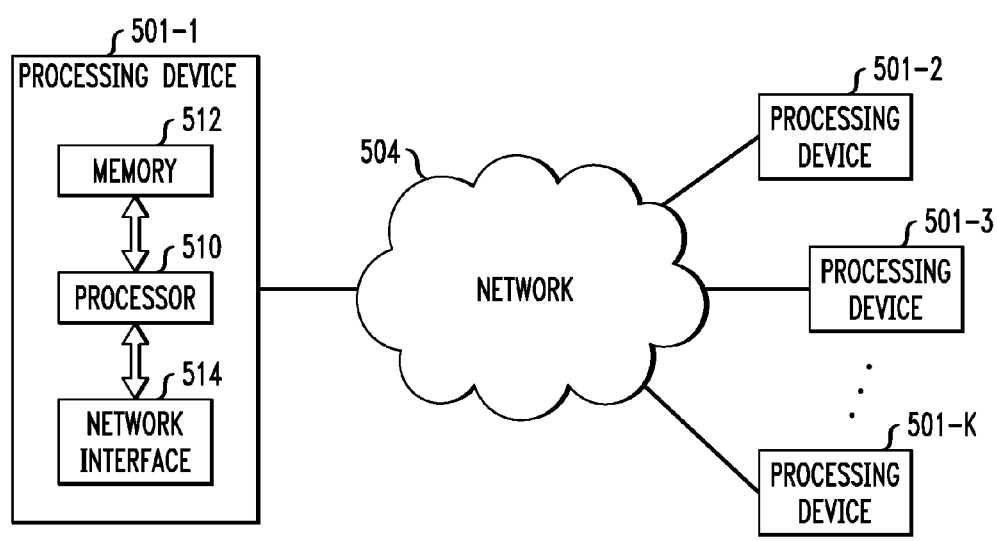
FIG. 5 illustrates an exemplary processing platform in which aspects of the present invention can be employed.

FIG. 5 illustrates an exemplary processing platform in which aspects of the present invention can be employed. The exemplary processing platform 500 comprises a plurality of processing devices, denoted 502-1, 502-2, 502-3, ... 502-K, that communicate with one another over a network 504. The network 504 may comprise any type of network, such as a WAN, a LAN, a satellite network, a telephone or cable network, or various portions or combinations of these and other types of networks.

The processing device 502-1 in the processing platform 500 comprises a processor 510 coupled to a memory 512. The processor 510 may comprise a microprocessor, a microcontroller, an application-specific integrated circuit (ASIC), a field-programmable gate array (FPGA) or other type of processing circuitry, as well as portions or combinations of such circuitry elements, and the memory 512, which may be viewed as an example of a "computer program product" having executable computer program code embodied therein, may comprise random access memory (RAM), read-only memory (ROM) or other types of memory, in any combination.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in FIG. 5 is presented by way of example only, and system 200 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the replicated file system synchronization techniques disclosed herein. Also, the particular configuration of system and device elements shown in FIGS. 1-5 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for migrating a data file from a first storage tier to an archive storage tier, wherein said data file exceeds one or more of performance limitations and capacity limitations of the archive storage tier, said method comprising:
   writing said data file from said first storage tier to a plurality of sub-files on said archive storage tier using a parallel log-structured file system middleware process that employs a write thread for each sub-file, wherein said parallel log-structured file system middleware process executes on at least one processing device between said first storage tier and said archive storage tier, wherein each of said plurality of sub-files satisfy said performance and capacity limitations of the archive storage tier; and
   storing said plurality of sub-files to the archive storage tier using said parallel log-structured file system.

2. The method of claim 1, wherein said archive storage tier comprises a multi disk storage tier.

3. The method of claim 1, wherein said first storage tier comprises one or more of flash storage and disk storage.

4. The method of claim 1, wherein said first storage tier comprises a Lustre file system.

5. The method of claim 1, wherein said parallel log-structured file system middleware process divides a size of said data file by a file size limit of said archive storage tier to determine a number of said plurality of sub-files.

6. The method of claim 1, further comprising the step of reading said plurality of sub-files directly from said archive storage tier using a network file system (NFS).

7. An apparatus for migrating a data file from a first storage tier to an archive storage tier, wherein said data file exceeds one or more of performance limitations and capacity limitations of the archive storage tier, said apparatus comprising:
   a memory; and
   at least one hardware device operatively coupled to the memory and configured to:
   write said data file from said first storage tier to a plurality of sub-files on said archive storage tier using a parallel log-structured file system middleware process that employs a write thread for each sub-file, wherein said parallel log-structured file system middleware process executes on at least one processing device between said first storage tier and said archive storage tier, wherein each of said plurality of sub-files satisfy said performance and capacity limitations of the archive storage tier; and
   store said plurality of sub-files to the archive storage tier using said parallel log-structured file system.

8. The apparatus of claim 7, wherein said archive storage tier comprises a multi disk storage tier.

9. The apparatus of claim 7, wherein said first storage tier comprises one or more of flash storage and disk storage.

10. The apparatus of claim 7, wherein said first storage tier comprises a Lustre file system.

11. The apparatus of claim 7, wherein said parallel log-structured file system middleware process divides a size of said data file by a file size limit of said archive storage tier to determine a number of said plurality of sub-files.

12. The apparatus of claim 7, wherein said at least one hardware device is further configured to read said plurality of sub-files directly from said archive storage tier using a network file system (NFS).

13. An article of manufacture for migrating a data file from a first storage tier to an archive storage tier, wherein said data file exceeds one or more of performance limitations and capacity limitations of the archive storage tier, comprising a non-transitory machine readable recordable storage medium containing one or more programs which when executed implement the steps of:
   writing said data file from said first storage tier to a plurality of sub-files on said archive storage tier using a parallel log-structured file system middleware process that employs a write thread for each sub-file, wherein said parallel log-structured file system middleware process executes on at least one processing device between said first storage tier and said archive storage tier, wherein each of said plurality of sub-files satisfy said performance and capacity limitations of the archive storage tier; and storing said plurality of sub-files to the archive storage tier using said parallel log-structured file system.

14. The article of manufacture of claim 13, wherein said archive storage tier comprises a multi disk storage tier.

15. The article of manufacture of claim 13, wherein said first storage tier comprises one or more of flash storage and disk storage.

16. The article of manufacture of claim 13, wherein said first storage tier comprises a Lustre file system.

17. The article of manufacture of claim 13, wherein said parallel log-structured file system middleware process divides a size of said data file by a file size limit of said archive storage tier to determine a number of said plurality of sub-files.

18. The article of manufacture of claim 13, further comprising the step of reading said plurality of sub-files directly from said archive storage tier using a network file system (NFS).

19. The method of claim 1, wherein a plurality of read threads read the data file from the first storage tier.

20. The apparatus of claim 7, wherein a plurality of read threads read the data file from the first storage tier.

21. The article of manufacture of claim 13, wherein a plurality of read threads read the data file from the first storage tier.

* * * * *

UNITED STATES PATENT AND TRADEMARK OFFICE
CERTIFICATE OF CORRECTION

PATENT NO. : 9,501,488 B1
APPLICATION NO. : 14/143694
DATED : November 22, 2016
INVENTOR(S) : John M. Bent et al.

Page 1 of 1

It is certified that error appears in the above-identified patent and that said Letters Patent is hereby corrected as shown below:

Column 1, Line 67, replace "determine of a number" with --determine a number--.

Column 2, Line 63, replace "storage tier 150" with --storage tier 120--.

Column 4, Line 61, replace "Ganesha" with --Ganesha™--.

Signed and Sealed this
Twenty-second Day of August, 2017

Joseph Matal
*Performing the Functions and Duties of the
Under Secretary of Commerce for Intellectual Property and
Director of the United States Patent and Trademark Office*